(12) United States Patent
Endo et al.

(10) Patent No.: US 8,311,320 B2
(45) Date of Patent: Nov. 13, 2012

(54) COMPUTER READABLE RECORDING MEDIUM STORING DIFFERENCE EMPHASIZING PROGRAM, DIFFERENCE EMPHASIZING METHOD, AND DIFFERENCE EMPHASIZING APPARATUS

(75) Inventors: Susumu Endo, Kawasaki (JP); Takayuki Baba, Kawasaki (JP); Shuichi Shiitani, Kawasaki (JP); Yusuke Uehara, Kawasaki (JP); Daiki Masumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1056 days.

(21) Appl. No.: 12/256,970

(22) Filed: Oct. 23, 2008

(65) Prior Publication Data

US 2009/0110297 A1 Apr. 30, 2009

(30) Foreign Application Priority Data

Oct. 25, 2007 (JP) ................. 2007-277414

(51) Int. Cl.
*G06K 9/00* (2006.01)
(52) U.S. Cl. ........................................... 382/161
(58) Field of Classification Search .................. None
See application file for complete search history.

(56) References Cited

U.S. PATENT DOCUMENTS

| | | | |
|---|---|---|---|
| 6,320,578 B1 * | 11/2001 | Shiitani et al. ............... | 345/419 |
| 6,999,069 B1 * | 2/2006 | Watanabe et al. ............. | 345/419 |
| 2005/0068317 A1 | 3/2005 | Amakai | |
| 2008/0021882 A1 * | 1/2008 | Pu et al. ............................. | 707/3 |

FOREIGN PATENT DOCUMENTS

| | | |
|---|---|---|
| JP | 05-006419 | 1/1993 |
| JP | 09-138870 | 5/1997 |
| JP | A 2002-304394 | 10/2002 |
| JP | A 2004-272357 | 9/2004 |
| JP | 2005-207858 | 8/2005 |
| WO | WO2004/003850 | 1/2004 |

OTHER PUBLICATIONS

Notification of Reasons for Refusal dated Dec. 27, 2011, from corresponding Japanese Patent Application No. 2007-277414 (partial translation enclosed).

* cited by examiner

*Primary Examiner* — Vikkram Bali
(74) *Attorney, Agent, or Firm* — Greer, Burns & Crain Ltd.

(57) ABSTRACT

A difference emphasizing apparatus aligns a first three-dimensional model and a second three-dimensional model in orientation and position in accordance with a predetermined rule, and gets data of respective apices of the first three-dimensional model and the second three-dimensional model. Based on the gotten data, the apparatus finds a corresponding point on the first three-dimensional model, which corresponds to the apex of the second three-dimensional model in a direction of a particular axis. When the corresponding point is detected, the apparatus calculates a difference between the first three-dimensional model and the second three-dimensional model in the direction of the particular axis based on the corresponding point and the apex of the second three-dimensional model. The apparatus enlarges the difference in the direction of the particular axis, and calculates a position of the apex of the second three-dimensional model after the enlargement.

13 Claims, 18 Drawing Sheets

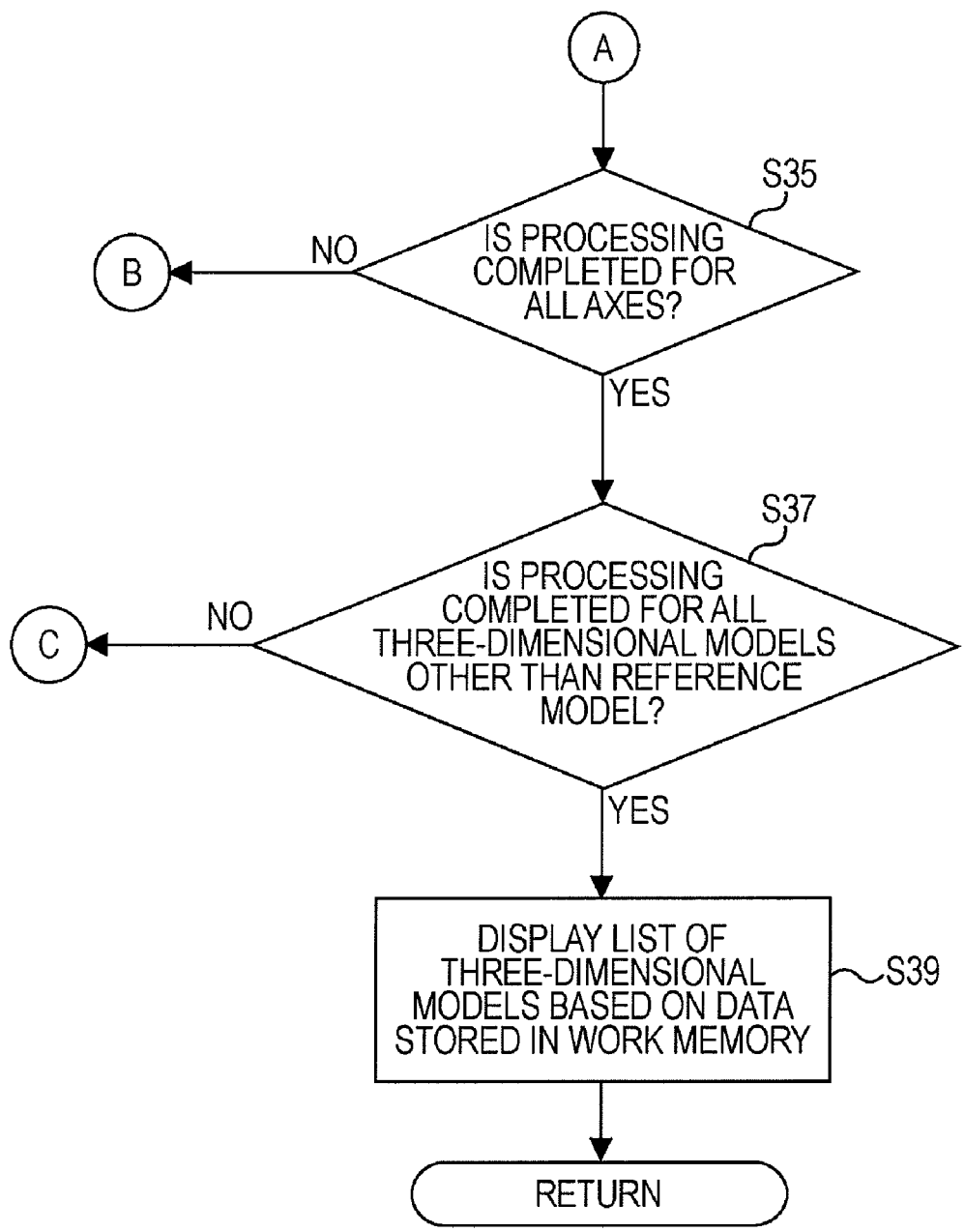

FIG. 9

$$\text{TRANSLATION MATRIX} = \begin{pmatrix} 1 & 0 & 0 & 0 \\ 0 & 1 & 0 & 0 \\ 0 & 0 & 1 & 0 \\ \Delta x & \Delta y & \Delta z & 1 \end{pmatrix}$$

$$\text{SCALING MATRIX} = \begin{pmatrix} Sx & 0 & 0 & 0 \\ 0 & Sy & 0 & 0 \\ 0 & 0 & Sz & 0 \\ 0 & 0 & 0 & 1 \end{pmatrix}$$

$$\text{ROTATION MATRIX} = \begin{pmatrix} 1 & 0 & 0 & 0 \\ 0 & \cos\theta_x & \sin\theta_x & 0 \\ 0 & -\sin\theta_x & \cos\theta_x & 0 \\ 0 & 0 & 0 & 1 \end{pmatrix} \begin{pmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{pmatrix} \begin{pmatrix} \cos\theta_z & \sin\theta_z & 0 & 0 \\ -\sin\theta_z & \cos\theta_z & 0 & 0 \\ 0 & 0 & 1 & 0 \\ 0 & 0 & 0 & 1 \end{pmatrix}$$

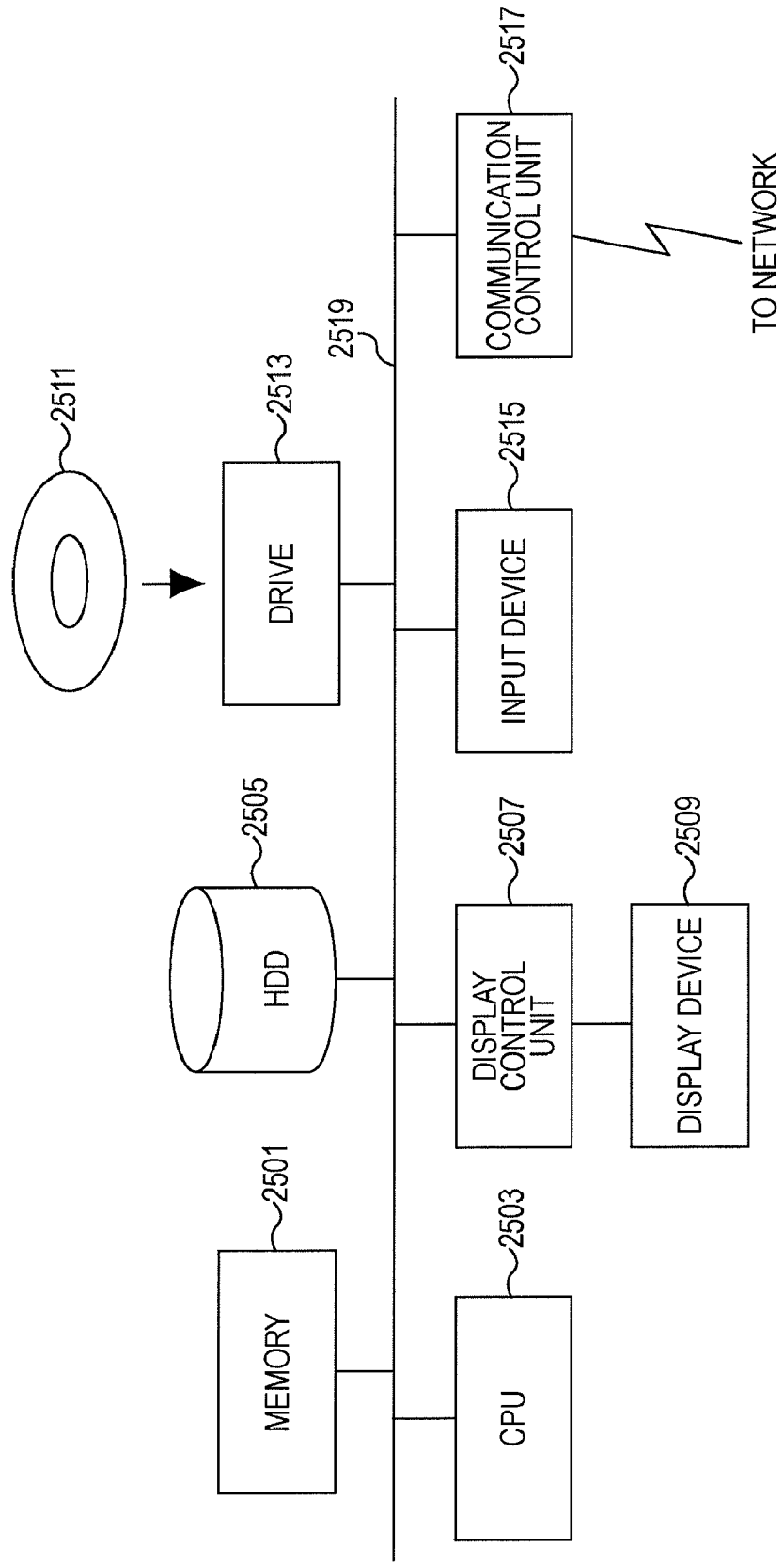

COMPUTER READABLE RECORDING MEDIUM STORING DIFFERENCE EMPHASIZING PROGRAM, DIFFERENCE EMPHASIZING METHOD, AND DIFFERENCE EMPHASIZING APPARATUS

CROSS-REFERENCE TO RELATED APPLICATIONS

This application is related to and claims priority to Japanese patent application no. 2007-277414 filed on Oct. 25, 2007 in the Japan Patent Office, and incorporated by reference herein

BACKGROUND OF THE INVENTION

1. Field of the Invention

The present invention relates to a technique for finding a desired three-dimensional model, and more particularly to a technique for easily confirming the difference between three-dimensional models.

2. Description of the Related Art

Hitherto, from among a plurality of three-dimensional models, an objective model has been found, for example, by a method of extracting three-dimensional models, which satisfy search conditions designated by a user, by employing metadata or the like added to each of the plurality of three-dimensional models, and presenting a list of the extracted three-dimensional models to the user. Then, the user visually finds the objective model from among the presented three-dimensional models. With such a known method, however, the list of the three-dimensional models is presented to the user by simply displaying the three-dimensional models, which satisfy the search conditions, in order. Therefore, the user has to visually compare the three-dimensional models and confirm the differences among the three-dimensional models. For example, when many three-dimensional models partially differing from one another just in portions are presented, it is difficult to quickly grasp all the differences among the three-dimensional models, and therefore a long time is taken to find the objective three-dimensional model.

Japanese Laid-open Patent Publication No. 2002-304394, for example, discloses a technique for easily specifying one product or one feature from among a variety of products. More specifically, a product satisfying search conditions entered by a user is searched for from a database storing individual numbers of many products, information of their external appearances, and photographs of their external appearances. The photograph of the external appearance of the detected product is presented to the user. With the technique disclosed in the above-cited Publication, the user can find the same product as the desired one by designating, e.g., the product number. However, when there is a plurality of similar products, the user has to visually confirm the photographs of the external appearances one by one. In other words, the above-mentioned problem cannot be overcome.

In addition, Japanese Laid-open Patent Publication No. 2004-272357, for example, discloses a technique of dividing an external appearance image of a particular apparatus, which is taken in by a camera, into plural regions, calculating for each of the regions the degree of match between the particular apparatus and each of several candidate apparatuses stored in a database, extracting one or more candidate apparatuses, which are similar to the particular apparatus, based on the degree of match calculated for each region, and presenting the candidate apparatuses. Further, with the technique disclosed in the above-cited Publication, when the similar candidate apparatuses are presented, the region in which the candidate apparatus does not match with the particular apparatus is displayed in an emphasized manner depending on the degree of match for each region. However, the case of using three-dimensional data is not taken into consideration.

Thus, the known techniques have difficulty confirming the differences among three-dimensional models, for example, when there are many three-dimensional models differing from one another just in their parts. Therefore, a long time is taken to find the objective three-dimensional model.

Accordingly, an object of the present invention is to provide a technique enabling the differences among three-dimensional models to be easily confirmed.

Another object of the present invention is to provide a technique enabling the objective three-dimensional model to be easily found.

SUMMARY OF THE INVENTION

A difference emphasizing apparatus aligns a first three-dimensional model and a second three-dimensional model in orientation and position in accordance with a predetermined rule, and stores, in a storage device, data of respective apices of the first three-dimensional model and the second three-dimensional model as aligned. Based on the data stored in the storage device, the apparatus finds a corresponding point on the first three-dimensional model, which corresponds to the apex of the second three-dimensional model in a direction of a particular axis. When the corresponding point is detected by the finding unit, the apparatus calculates a difference between the first three-dimensional model and the second three-dimensional model in the direction of the particular axis based on the corresponding point and the apex of the second three-dimensional model, and stores the calculated difference in the storage device. The apparatus enlarges the difference stored in the storage device in the direction of the particular axis, calculates a position of the apex of the second three-dimensional model after the enlargement, and stores the calculated position in the storage device.

BRIEF DESCRIPTION OF THE DRAWINGS

FIG. 4B is a flowchart showing a processing flow (second part) of the difference emphatically displaying process in the first embodiment;

FIG. 9 shows various kinds of matrixes;

FIG. 13 is a functional block diagram of a computer.

DESCRIPTION OF THE PREFERRED EMBODIMENTS

Figure 1A:
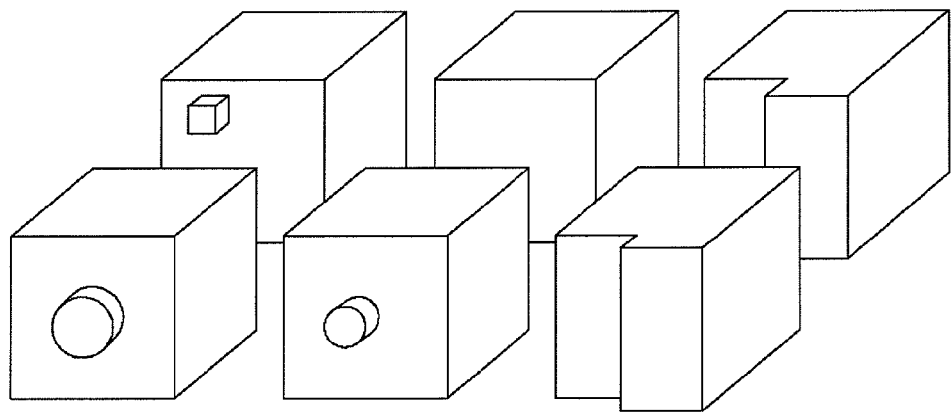
FIGS. 1A and 1B are illustrations for explaining the gist of an embodiment of the present invention.
Figure 1B:
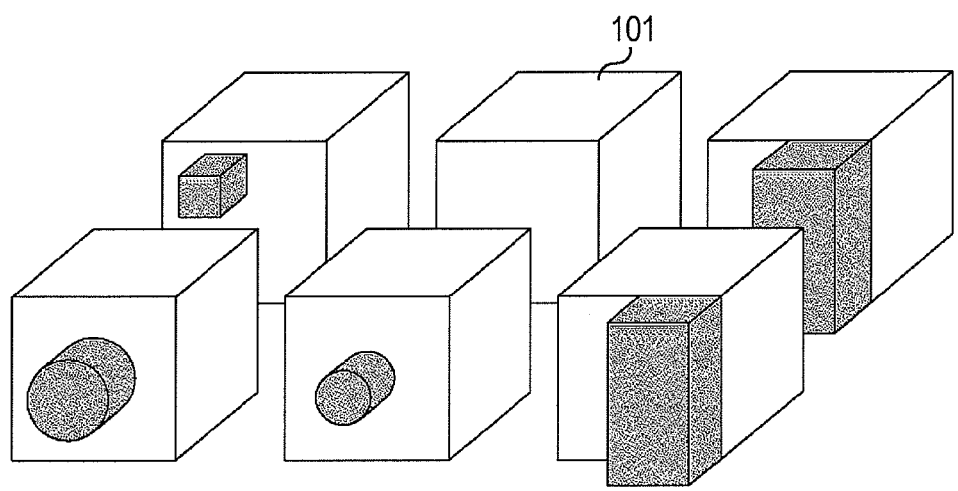

First, the gist of an embodiment of the present invention will be described with reference to FIGS. 1A and 1B. In the embodiment, three-dimensional models satisfying search conditions designated by a user are extracted and a list of the extracted three-dimensional models is presented to the user as shown, by way of example, in FIG. 1A. Note that although FIG. 1A shows one example where the number of three-dimensional models is six, the number of three-dimensional models is not limited to six. The user selects, from the presented list of three-dimensional models, a three-dimensional model serving as a reference (hereinafter referred to as a "reference model"). In response to the selection of the reference model by the user, differences between the reference model (three-dimensional model 101 in FIG. 1B) and three-dimensional models other than the reference model are displayed in an emphasized manner as shown, by way of example, in FIG. 1B. In the example of FIG. 1B, the differences between the reference model and the three-dimensional models other than the reference model are enlarged and different portions after the enlargement are displayed with coloring. As a result, the user can easily confirm the differences between the reference model and the three-dimensional models other than the reference model.

Figure 2:
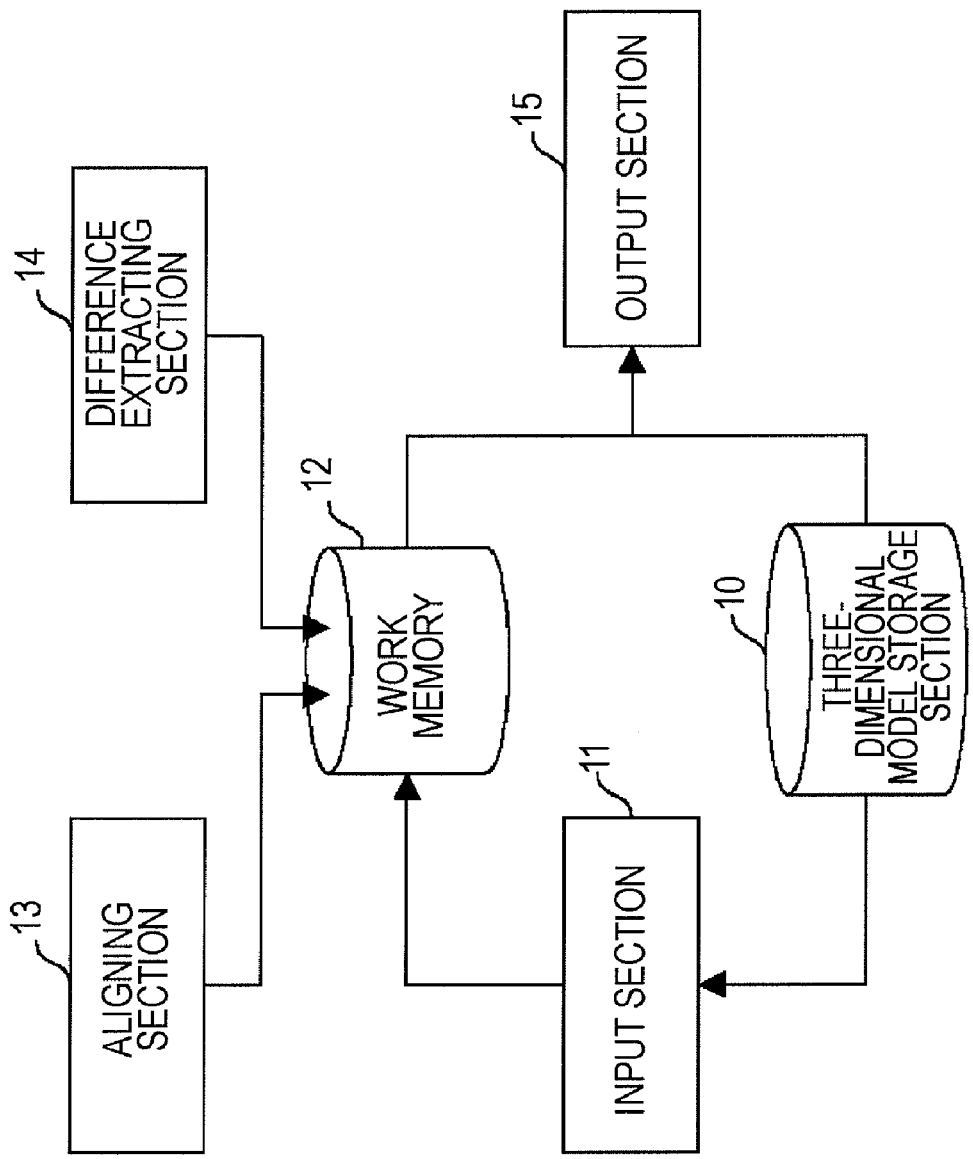
FIG. 2 is a block diagram of a difference emphasizing apparatus.

A first embodiment of the present invention will be described below. FIG. 2 shows one example of a functional block diagram of a difference emphasizing apparatus according to the first embodiment of the present invention. The difference emphasizing apparatus comprises a three-dimensional model storage section 10, an input section 11, a work memory 12, an aligning section 13, a difference extracting section 14, and an output section 15. The three-dimensional model storage section 10 stores data representing apex positions and polygons, which constitute each three-dimensional model. The input section 11 extracts, from the three-dimensional model storage section 10, the data of each three-dimensional model satisfying the search conditions designated by the user, and stores the extracted data in the work memory 12. The aligning section 13 executes an orientation and position aligning process on the three-dimensional models stored in the work memory 12. The difference extracting section 14 extracts, based on the data stored in the work memory 12, the differences between the reference model and the three-dimensional models other than the reference model. The output section 15 presents a list of the three-dimensional models to the user based on the data stored in the three-dimensional model storage section and the work memory 12. The work memory 12 is held, for example, in a main memory of the difference emphasizing apparatus.

Figure 3:
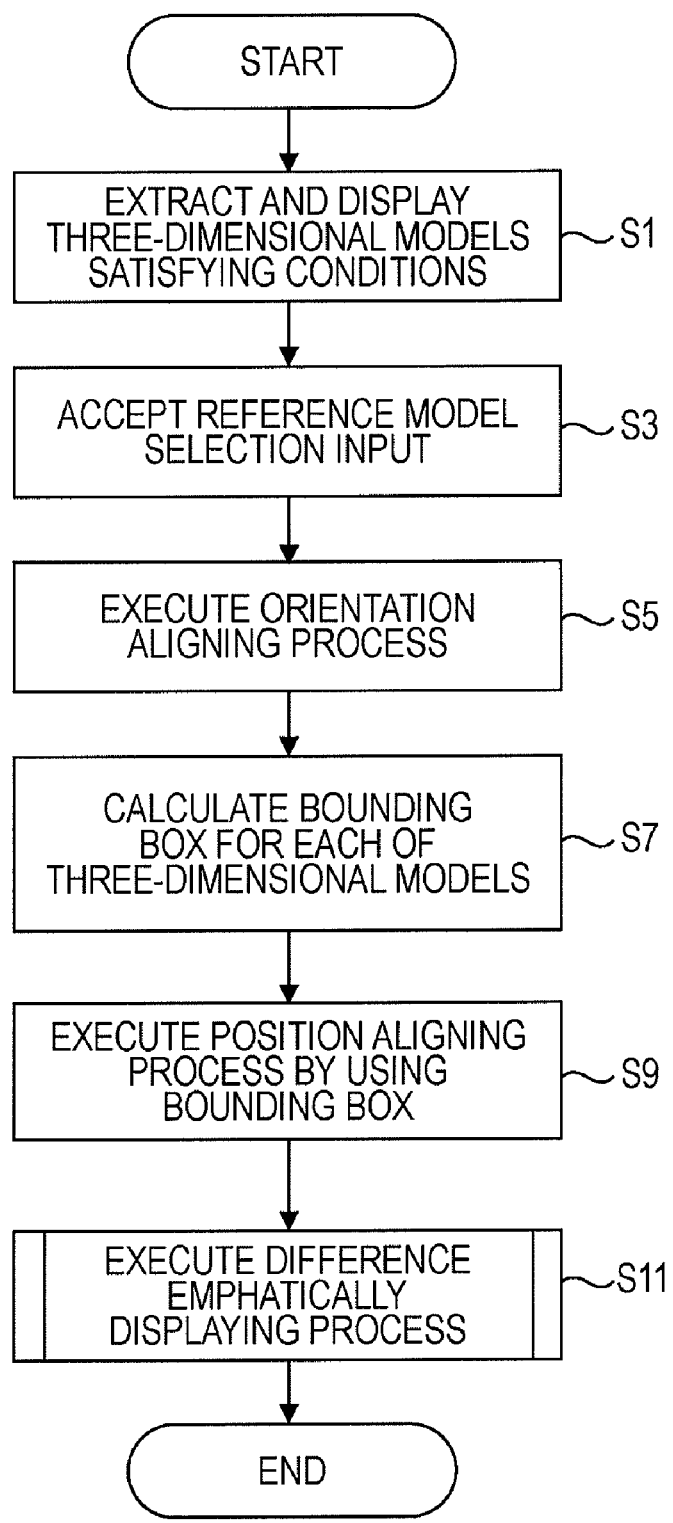
FIG. 3 is a flowchart showing a processing flow.

An overall processing flow of the embodiment will be described below with reference to FIG. 3. First, the user operates a mouse, a keyboard or the like and enters search conditions for finding an objective three-dimensional model. Upon accepting the input of the search conditions from the user, the input section 11 of the difference emphasizing apparatus extracts, from the three-dimensional model storage section 10, the three-dimensional models satisfying the search conditions and temporarily loads the extracted three-dimensional models in the work memory 12. Based on the data stored in the work memory 12, the output section 15 displays the list of the extracted three-dimensional models on, e.g., a display device (step S1 in FIG. 3). Since the process of extracting the three-dimensional models satisfying the search conditions is known, a description of that process is omitted here.

Then, the user clicks, e.g., a mouse on a display screen and selects the reference model, which serves as a reference, from the list of the three-dimensional models. The input section 11 accepts a reference model selection input from the user (step S3) and stores, in the work memory 12, the data representing the reference model.

The aligning section 13 executes the orientation aligning process for each of the three-dimensional models stored in the work memory 12 (step S5). More specifically, the aligning section 13 calculates, for each of the three-dimensional models, a first primary component, a second primary component, and a third primary component based on a primary component analysis, for example, thereby extracting an axis of each primary component. With the primary component analysis, because the primary components are calculated in a mutually uncorrelated manner, respective axes of the primary components are orthogonal to each other. The primary component analysis is itself well known, and therefore a detailed description thereof is omitted here. Further, the aligning section 13 rotates each three-dimensional model such that the extracted three axes are mapped to the X-axis, the Y-axis and the Z-axis, respectively. For example, because matrices coupled to each other with the length of a vector of each axis normalized to 1 can be regarded as a rotation matrix, the position of each apex of the three-dimensional model after the rotation can be calculated by multiplying the apex of the three-dimensional model by an inverse matrix of the rotation matrix. Thus, the aligning section 13 executes the above-described process and stores the position of each apex of the three-dimensional model after the rotation in the work memory 12.

Then, the aligning section 13 calculates, for each of the three-dimensional models, a parallelepiped (hereinafter referred to as a "bounding box") circumscribing the three-dimensional model (step S7). The bounding box can be calculated from maximum and minimum values of the apices of the three-dimensional model after the rotation.

Then, the aligning section 13 executes the position aligning process of the three-dimensional model by using the bounding box (step S9). More specifically, the aligning section 13 executes the position aligning process such that centers of the bounding boxes are matched with one another. The aligning section 13 calculates the position of each apex of the three-dimensional model after the position alignment and stores it in the work memory 12.

Then, the difference extracting section 14 and the output section 15 execute a later-described difference emphatically displaying process based on the data stored in the work memory 12 (step S11). The processing flow is thereby brought to an end. Though not shown, when the input section 11 accepts a new reference model selection input from the user, the processing of steps S3 through S11 is repeated.

The difference emphatically displaying process will be described with reference to FIG. 4A. First, the difference extracting section 14 refers to the work memory 12 and specifies a not-yet-processed one of the three-dimensional models other than the reference model (step S21 in FIG. 4A). Then, the difference extracting section 14 specifies not-yet-processed one of an X-axis, a Y-axis and a Z-axis (step S23). Further, the difference extracting section 14 specifies a not-yet-processed one of apices of the specified three-dimensional model (step S25).

Figure 5A:
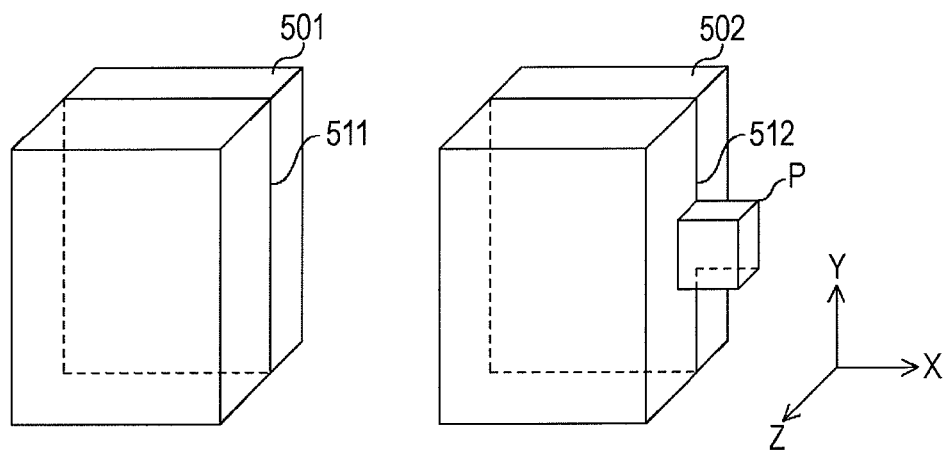
FIGS. 5A and 5B are illustrations for explaining a process of finding a corresponding point.
Figure 5B:
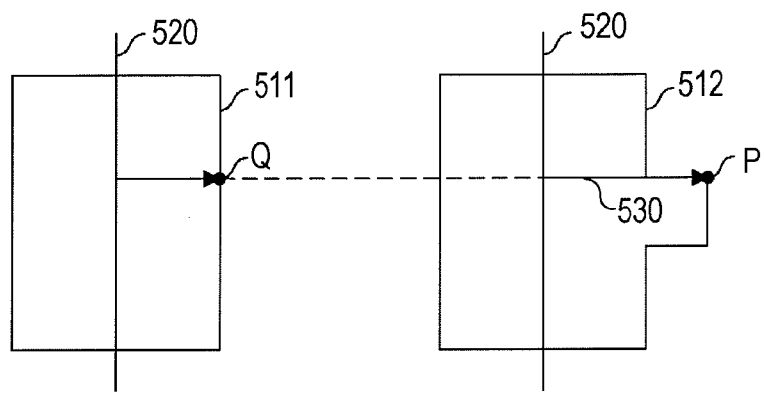

Based on the data of the apex positions and polygons of the three-dimensional model, which is stored in the work memory 12, the difference extracting section 14 finds a point on the reference model which corresponds to the specified apex in the direction of the specified axis (step S27). Such a finding process will be described with reference to FIGS. 5A and 5B. Assuming that a three-dimensional model 501 (on the left side in FIG. 5A) is the reference model and a three-dimensional model 502 (on the right side in FIG. 5A) is the specified model, the description is made here in connection with the case of specifying a point on the reference model in the direction of the X-axis (horizontal axis), which corresponds to a point P on the specified model. Although two three-dimensional models are superimposed with each other by the position aligning process (step S9), those two three-dimensional models are shown in FIG. 5A at separate positions for the sake of explanation. In the three-dimensional models 501 and 502, as shown in FIG. 5A, respective XY-planes passing the point P are assumed to be a cross-section 511 and a cross-section 512. Although the description is made here in connection with the case of using a cross-section on the XY-plane, processing can also be executed in a similar manner by using a cross-section on the XZ-plane. FIG. 5B shows the cross-section 511 on the left side and the cross-section 512 on the right side. In FIG. 5B, a linear line 520 represents a line linearly extending parallel to the Y-axis and passing the center of a bounding box of each of the three-dimensional models 501 and 502. A linear line 530 represents a line linearly extending in the X-axis direction and passing the point P. The finding process is performed by following the linear line 530 toward the point P from an intersection between the linear lines 520 and 530 to find an intersection between an outer peripheral line of the cross-section 511 and the linear line 530. If there is the intersection between the outer peripheral line of the cross-section 511 and the linear line 530, that intersection is detected as the corresponding point. In the example of FIG. 5B, a point Q is detected as the point corresponding to the point P, i.e. the corresponding point.

If the corresponding point is detected ("Yes" route from step S29), the difference extracting section 14 calculates a difference between the specified apex and the corresponding point on the specified axis and calculates a coordinate resulting after enlarging the difference in the direction of the specified axis (step S31), followed by storing the coordinate in the work memory 12. For example, when the processing is executed with respect to the X-axis direction, a coordinate x' after the enlargement can be calculated based on the following formula (1) on the assumption that an X coordinate at the corresponding point is x1 and an X coordinate at the specified point is x2. In the formula (1), $\alpha$ is an enlargement rate and takes a value of 1 or more.

$$x'=(x2-x1)\times\alpha+x1 \tag{1}$$

The difference extracting section 14 stores the calculated coordinate x', as the X coordinate of the specified apex, in the work memory 12. Assuming, for example, that respective coordinates (X, Y, Z) of the points P and Q are P(6, 1, 1) and Q(4, 1, 1) and $\alpha$ is 2, x' is expressed by $(6-4)\times 2+4=8$. In other words, assuming the apex after the enlargement to be a point P', coordinates of the point P' are given by P'(8, 1, 1). Then, the difference extracting section 14 shifts to processing of step S33.

On the other hand, if the corresponding point on the reference model is not detected ("No" route from step S29), the difference extracting section 14 determines whether the processing is completed for all of the apices (step S33). If there is an apex that is not yet processed ("No" route from step S33), the difference extracting section 14 returns to the processing of step S25. If the processing is completed for all of the apices ("Yes" route from step S33), the difference extracting section 14 shifts to processing of step S35 (FIG. 4B) as indicated by a junction A.

Figure 4A:
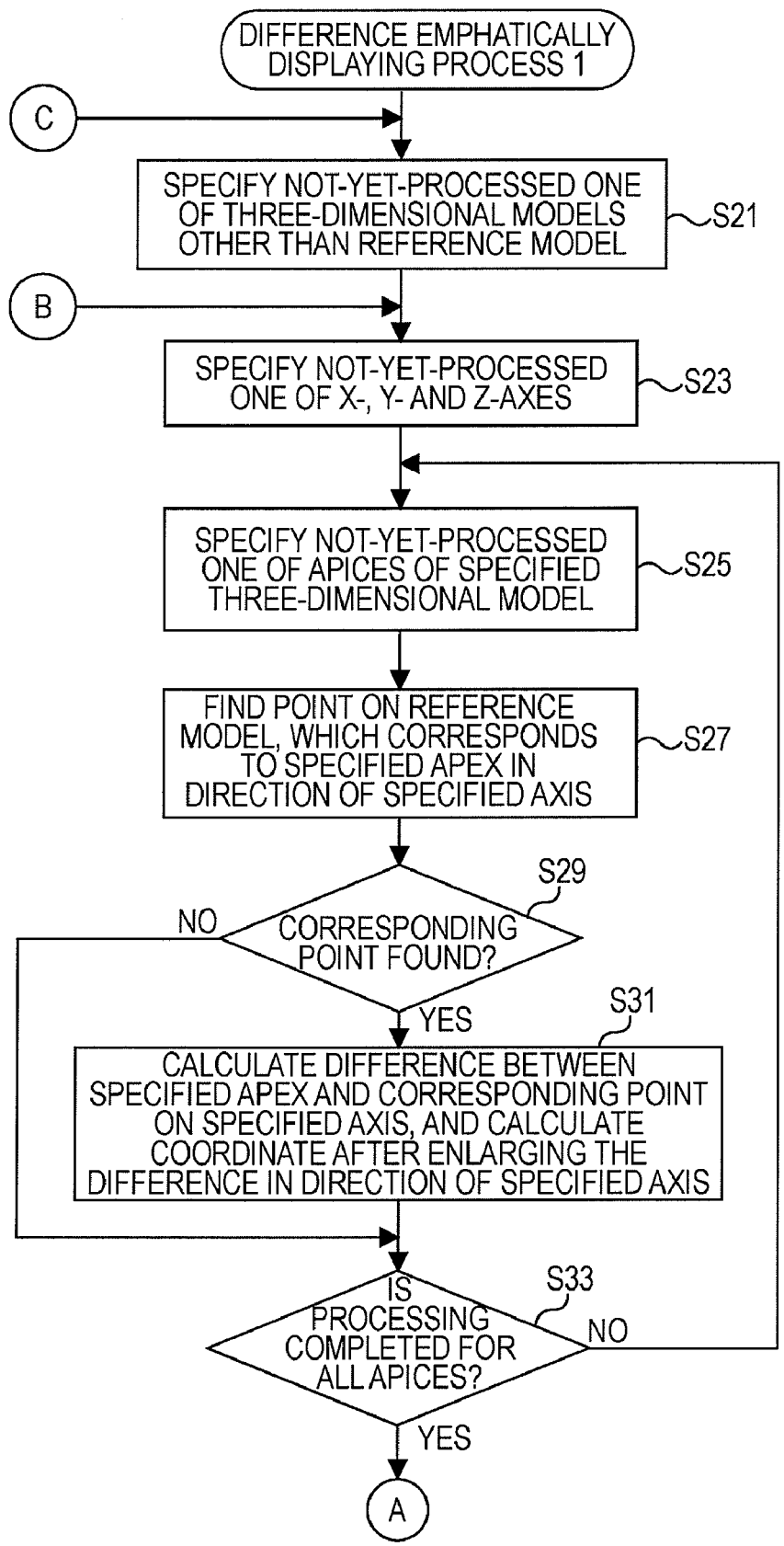
FIG. 4A is a flowchart showing a processing flow (first part) of a difference emphatically displaying process in a first embodiment.

After shifting to the flowchart of FIG. 4B, the difference extracting section 14 determines whether the processing is completed for all of the axes (step S35). If there is an axis that is not yet processed ("No" route from step S35), the difference extracting section 14 returns to the processing of step S23 (FIG. 4A) as indicated by a junction B. If the processing is completed for all of the axes ("Yes" route from step S35), the difference extracting section 14 refers to the work memory 12 and determines whether the processing is completed for all of the three-dimensional models other than the reference model (step S37) If the processing is not yet completed for all of the three-dimensional models other than the reference model ("No" route from step S37), the difference extracting section 14 returns to the processing of step S21 (FIG. 4A) as indicated by a junction C.

On the other hand, if the processing is completed for all of the three-dimensional models other than the reference model ("Yes" route from step S37), the output section 15 displays a list of the three-dimensional models on, e.g., the display device based on the data stored in the work memory 12 (step S39). Thereafter, the difference extracting section 14 returns to the main processing flow.

Figure 6A:
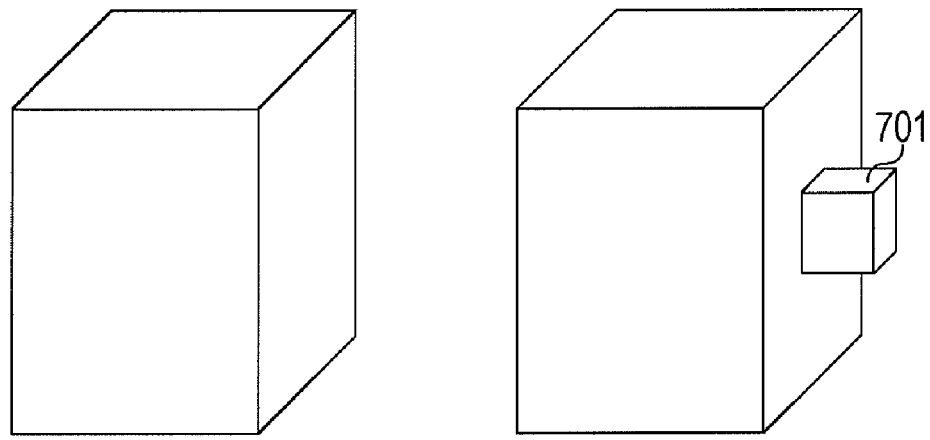
FIGS. 6A and 6B are illustrations for explaining emphatic display in the first embodiment.
Figure 6B:
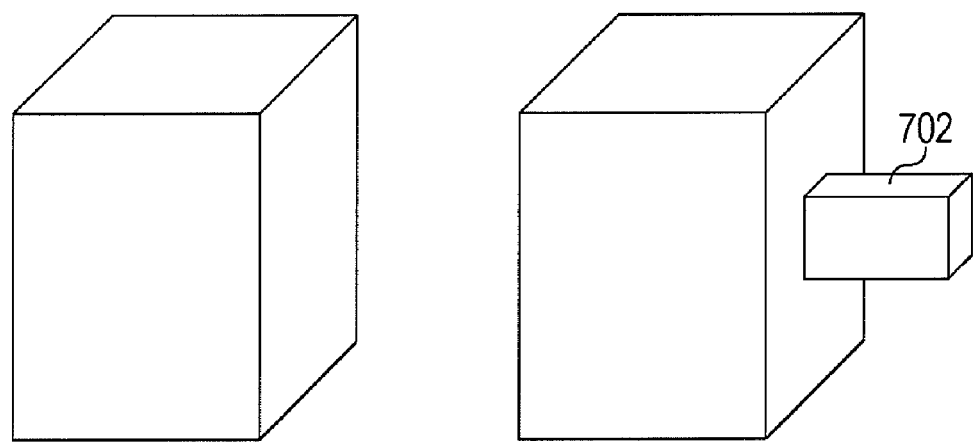

In the case of processing two three-dimensional models shown in FIG. 6A, for example, when the three-dimensional model on the left side is selected as the reference model, those two three-dimensional models are displayed as shown in FIG. 6B. A parallelepiped 702 in FIG. 6B is created by extending a parallelepiped 701 (FIG. 6A), i.e., a difference between those two three-dimensional models, only in the horizontal direction.

By executing the above-described processing, the difference between the reference model and the three-dimensional model other than the reference model can be displayed in an enlarged size in the direction of the specified axis, so the user can easily confirm the difference between the three-dimensional models. Also, an enlarged portion can be displayed with coloring based on comparison of the position of the apex of the three-dimensional model after the position aligning process (step S9) with the position of the apex of the three-dimensional model after the enlargement. Additionally, the processing may be modified such that the enlargement is not executed if the difference calculated in the processing of step S31 is smaller than a predetermined value.

A second embodiment of the present invention will be described below. In the second embodiment, when the reference model is compared with the three-dimensional model other than the reference model, a region which exists only in the reference model (hereinafter referred to as a "− region") and a region which exists only in the three-dimensional model other than the reference model (hereinafter referred to as a "+ region") are first extracted. Then, the "− region" and/or the "+ region" (hereinafter referred to collectively as a "difference region") is entirely enlarged, or at least part of the difference region is colored.

Figure 7A:
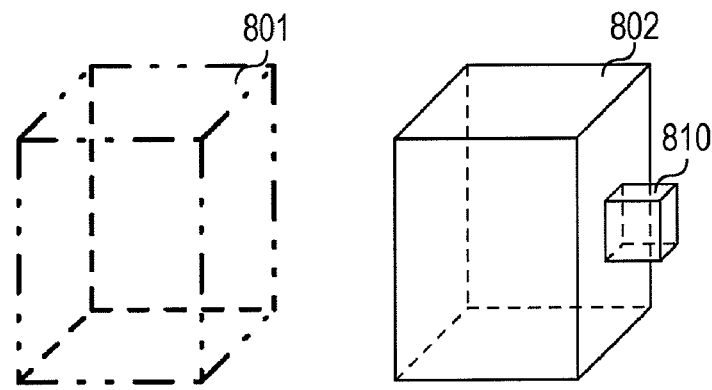
FIGS. 7A, 7B and 7C are illustrations for explaining the gist of a second embodiment.
Figure 7B:
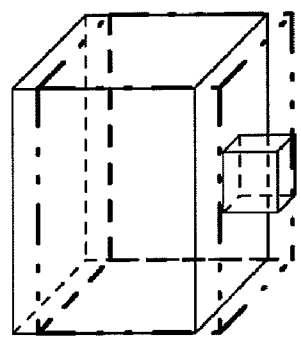
Figure 7C:
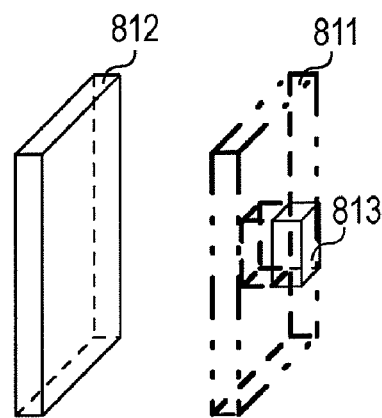
Figure 8A:
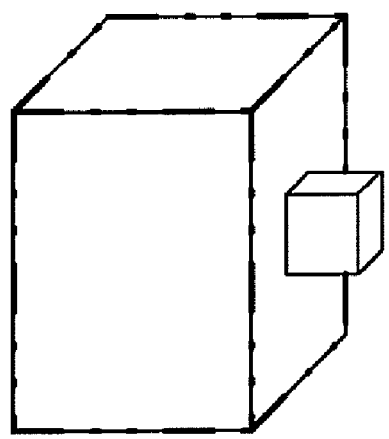
FIGS. 8A and 8B are illustrations for explaining the gist of the second embodiment.
Figure 8B:
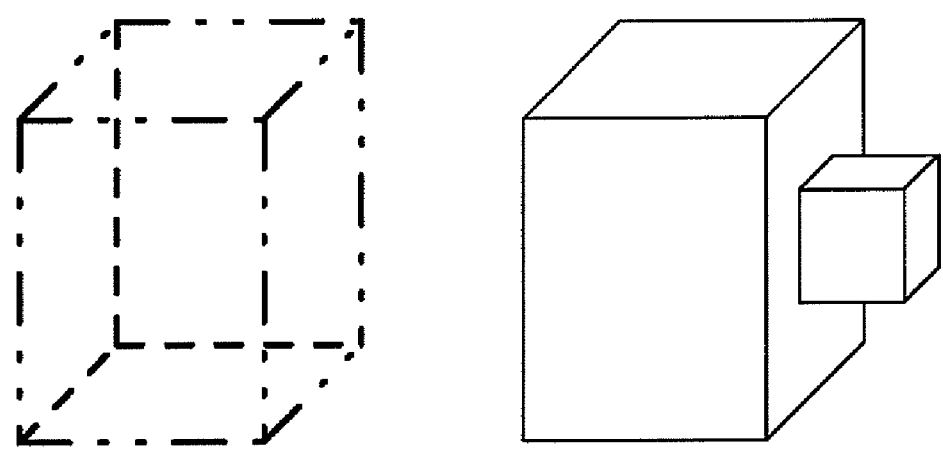

First, the gist of the second embodiment will be described. For example, when the orientation aligning process (step S5) and the position aligning process (steps S7 and S9), both described in the first embodiment, are executed on two three-dimensional models (801 and 802 in FIG. 7A) which differ only in that the model 802 has a parallelepiped 810 as shown in FIG. 7A, those two three-dimensional models are superimposed with each other as shown in FIG. 7B. When a difference between those two three-dimensional models is extracted in such a state, a region 811 is extracted as a region that exists only in the three-dimensional model 801, and regions 812 and 813 are extracted as regions that exist only in the three-dimensional model 802, as shown in FIG. 7C. In other words, a genuine difference between the two three-dimensional models, i.e., only a portion corresponding to the parallelepiped 810, cannot be extracted. Taking into account such a point, in the second embodiment, as described in detail below, at least one of the position and size of one of the three-dimensional models is modified such that those two three-dimensional models are superimposed with each other as shown in FIG. 8A. Then, the portion corresponding to the parallelepiped 810 is extracted as the difference between those two three-dimensional models and the parallelepiped 810 is displayed in an enlarged size in its entirety as shown in FIG. 8B.

Figure 4C:
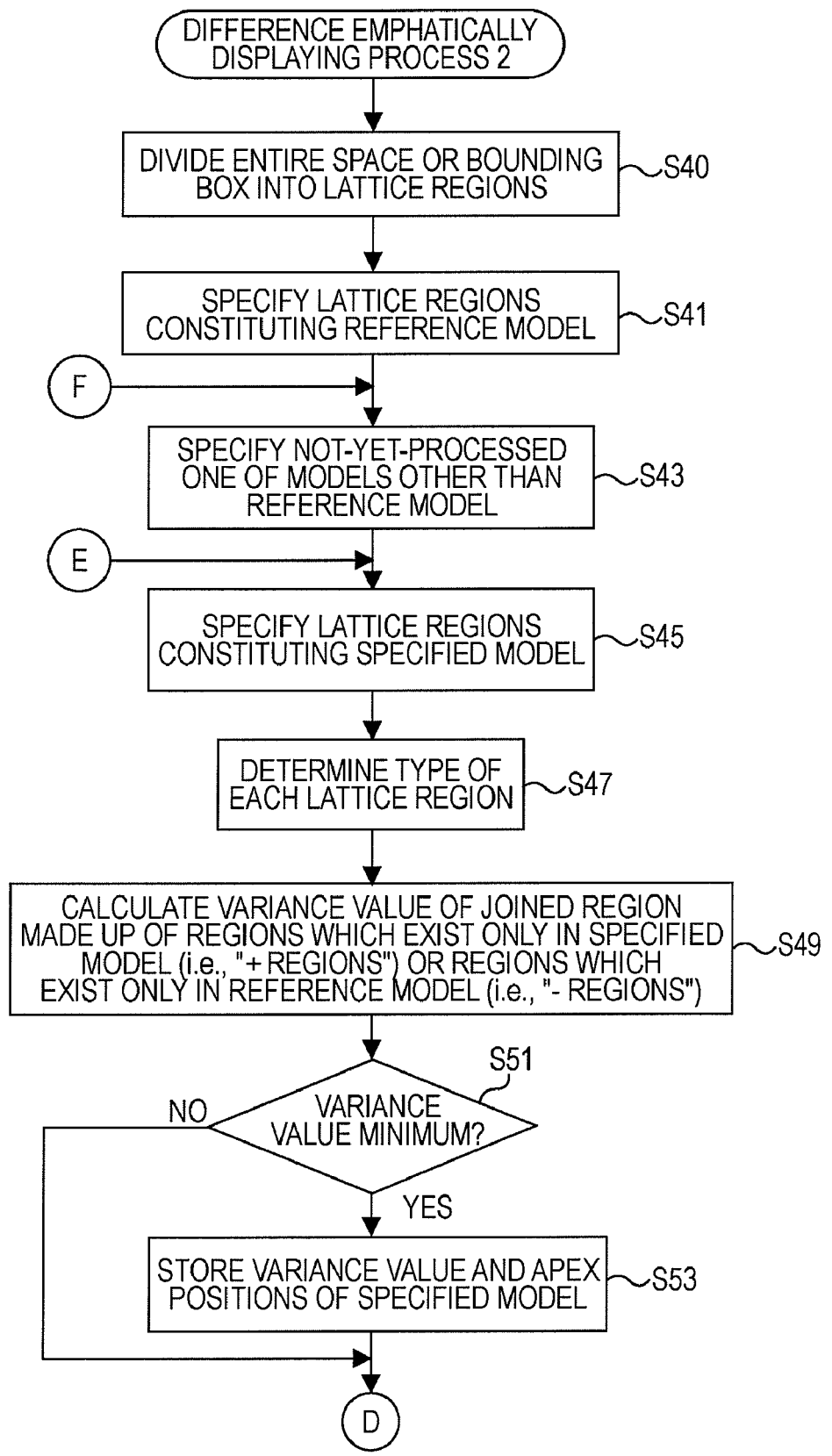
FIG. 4C is a flowchart showing a processing flow (first part) of a difference emphatically displaying process in a second embodiment.
Figure 4D:
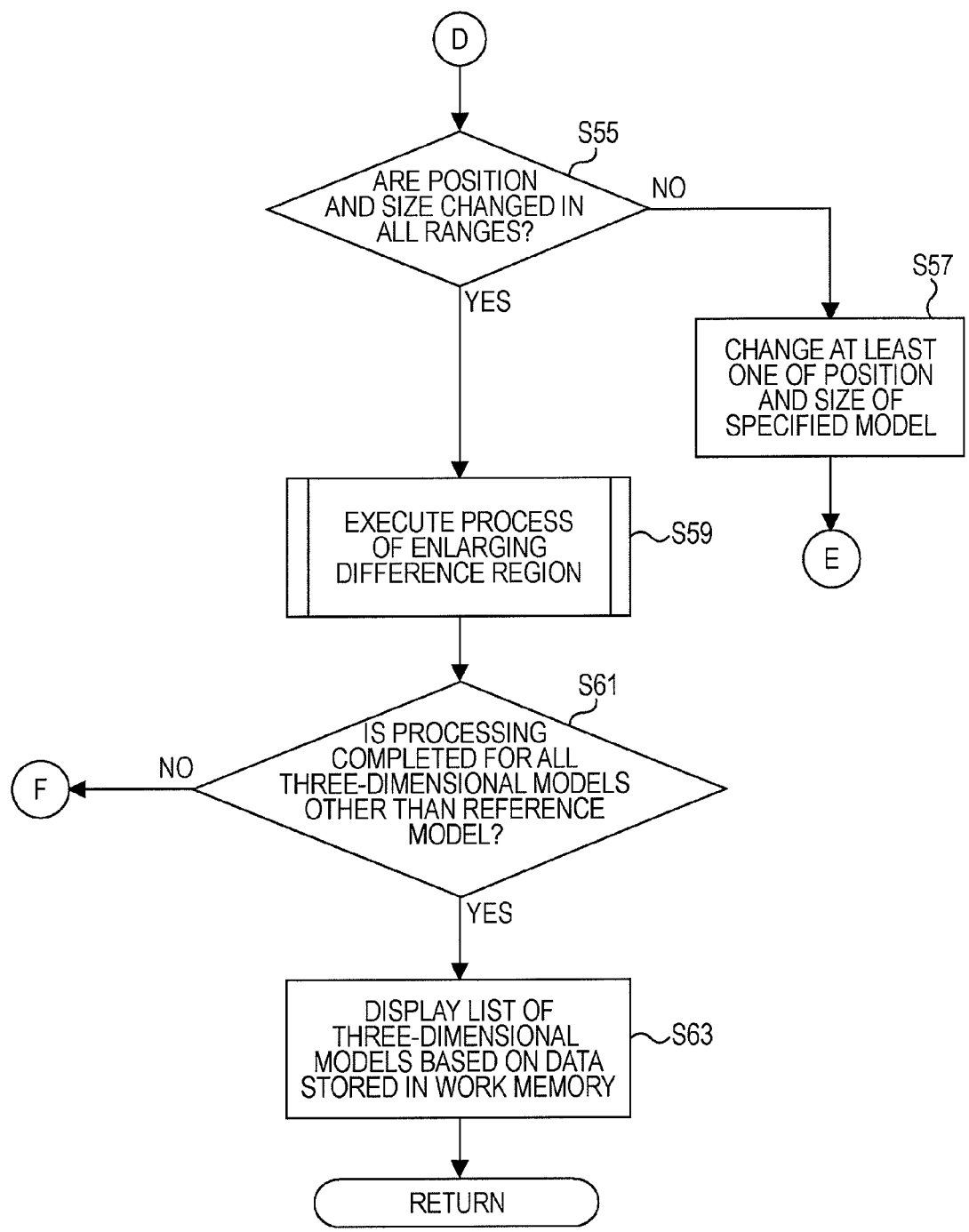
FIG. 4D is a flowchart showing a processing flow (second part) of the difference emphatically displaying process in the second embodiment.

Processing executed in the second embodiment will be described in detail below. While an overall processing flow in the second embodiment is basically the same as that described above in the first embodiment, a displaying process with differences emphasized, shown in FIGS. 4C and 4D, are executed in step S11 in the second embodiment. The emphasized difference displaying process in the second embodiment is described below.

First, the aligning section 13 divides the whole of a space covering a three-dimensional model or the interior of a bounded box into lattices and stores the positions of apices of each lattice region in the work memory 12 (step S40). Then, the aligning section 13 specifies the lattice regions constituting the reference model (step S41) based on the data of the apex positions and polygons of the reference model and the apex positions of the lattice regions, which are stored in the work memory 12. More specifically, the aligning section 13 determines with respect to each of the lattice regions whether the relevant lattice region is included in the reference model, and stores, in the work memory 12, a three-dimensional matrix in which, for example, an element represents the determination result per lattice region (specifically, a value 1 of the element indicates that the relevant lattice region is included in the reference model, and a value 0 of the element indicates that the relevant lattice region is not included in the reference model).

Further, the aligning section 13 refers to the work memory 12 and specifies a not-yet-processed one of the three-dimensional models other than the reference model (step S43). Then, the aligning section 13 specifies the lattice regions constituting the specified model (step S45) based on the data of the apex positions and polygons of the specified model and the apex positions of the lattice regions, which are stored in the work memory 12. In a manner similar to that described above, the aligning section 13 determines with respect to each of the lattice regions whether the relevant lattice region is included in the specified model, and stores, in the work memory 12, a three-dimensional matrix in which, for example, an element represents the determination result per lattice region.

Then, the aligning section 13 refers to the three-dimensional matrix stored in the work memory 12 and determines the type of each lattice region (step S47). More specifically, the aligning section 13 determines with respect to each lattice region whether it is (1) the "− region", (2) the "+ region", (3) a region that exists in both models (hereinafter referred to as a "0 region"), or (4) a region that does not belong to any of the models (hereinafter referred to as an "out-of-model region"). The determination result is stored in a table (not shown) within the work memory 12. By using the above-described three-dimensional matrix, the determination can be executed at a high speed just by comparing the elements of both matrices with each other. The type of each lattice region may be held in the form of a three-dimensional matrix. Then, the aligning section 13 refers to the table within the work memory 12 and calculates a variance value of a region obtained by joining plural regions having the type of "− region" or "+ region" together (step S49). More specifically, assuming that the position and the volume of the lattice region having the type of "+ region" or "− region" are p(i) and v(i), respectively, a mean position A and a variance value (distribution) a can be calculated based on the following formulae.

$$A = \Sigma p(i) \times v(i) / \Sigma v(i) \qquad (2)$$

$$\sigma = \Sigma dis(p(i),A)^2 \times v(i) / \Sigma v(i) \qquad (3)$$

In this embodiment, because the lattice regions are divided in the same size and have the constant volume v(i), the formulae (2) and (3) can be developed as follows, assuming that the number of regions having the type of "+ region" or "− region" is n.

$$A = \Sigma p(i) / n \qquad (4)$$

$$\sigma = \Sigma dis(p(i),A)^2 / n \qquad (5)$$

Then, the aligning section 13 determines whether the calculated variance value is minimum (step S51). Note that an initially calculated variance value is temporarily determined as the minimum. If the calculated variance value is minimum ("Yes" route from step S51), the aligning section 13 stores the calculated variance value and the apex positions of the specified model in the work memory 12 (step S53) and shifts to processing of step S55 (FIG. 4D) as indicated by a junction D. On the other hand, if the calculated variance value is not minimum ("No" route from step S51), the aligning section 13 skips the processing of step S53 and shifts to the processing of step S55 (FIG. 4D) as indicated by the junction D.

After shifting to the flowchart of FIG. 4D, the aligning section 13 determines whether the position and the size are changed in all predetermined ranges (step S55). If the position and the size are not changed in all of the predetermined ranges ("No" route from step S55), the aligning section 13 changes at least one of the position and the size of the specified model (step S57). The aligning section 13 calculates the apex positions of the specified model after the change by multiplying the coordinates of each apex of the specified model by a translation matrix (FIG. 9) when the specified model is to be translated, or by a scaling matrix (FIG. 9) when the size of the specified model is to be changed. While this embodiment does not take a change of orientation into consideration because the orientation aligning process (step S5) is executed in advance, the orientation may also be changed in some cases. In such a case, the apex positions of the three-dimensional model after the change of the orientation can be calculated by using a rotation matrix shown in FIG. 9. The aligning section 13 then returns to the processing of step S45 (FIG. 4C) as indicated by a junction E.

On the other hand, if the position and the size are changed in all of the predetermined ranges ("Yes" route from step S55), the difference extracting section 14 executes a difference region enlarging process based on the data stored in the work memory 12 (step S59).

Figure 4E:
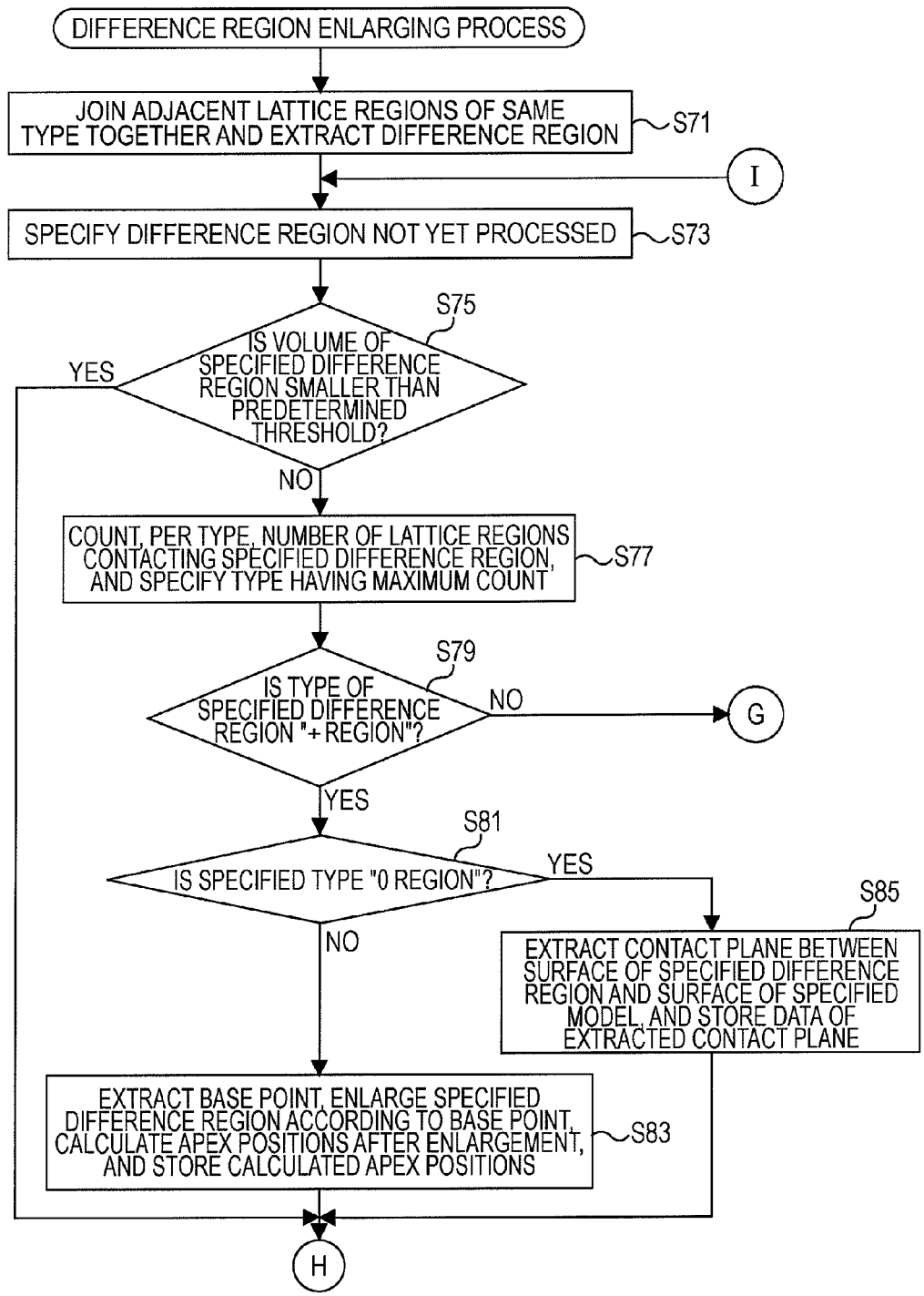
FIG. 4E is a flowchart showing a processing flow (first part) of a different region enlarging process.

The difference region enlarging process will now be described. First, the difference extracting section 14 refers to the table within the work memory 12 and joins adjacent lattice regions of the same type together, thereby extracting a difference region (step S71 in FIG. 4E). Then, the difference extracting section 14 specifies a not-yet-processed one of the extracted difference regions (step S73). Further, the difference extracting section 14 determines whether the volume of the specified difference region is smaller than a predetermined threshold (step S75). If the volume of the specified difference region is smaller than the predetermined threshold ("Yes" route from step S75), the difference extracting section 14 shifts to processing of step S93 (FIG. 4F) as indicated by a junction H. If the volume of the specified difference region is not smaller than the predetermined threshold ("No" route from step S75), the difference extracting section 14 refers to the table within the work memory 12 and counts the number of lattice regions contacting the specified difference region per type (i.e., for each of "− region", "+ region", "0 region" and "out-of-model region"), thereby specifying the type that provides a maximum count of the lattice regions contacting the specified difference region (step S77).

Further, the difference extracting section 14 determines whether the type of the specified difference region is the "+ region" (step S79). If the type of the specified difference region is not the "+ region" ("No" route from step S79), i.e., if the type of the specified difference region is the "− region", the difference extracting section 14 shifts to processing of step S87 (FIG. 4F) as indicated by a junction G.

On the other hand, if the type of the specified difference region is the "+ region" ("Yes" route from step S79), the difference extracting section 14 determines whether the type specified in the processing of step S77 is the "0 region" (step S81). If the type specified in the processing of step S77 is not the "0 region" ("No" route from step S81), the difference extracting section 14 extracts a base point, enlarges the specified difference region according to the base point, calculates apex positions after the enlargement, and stores the calculated apex positions in the work memory 12 (step S83). More specifically, if the number of lattice regions of the "0 region" type, which has been counted in step S77, is 0 (i.e., if the specified difference region does not contact the lattice region of the "0 region" type), the difference extracting section 14 extracts, as the base point, the center of the specified difference region. If the number of lattice regions of the "0 region" type, which has been counted in step S77, is 1 or more (i.e., if the specified difference region contacts the lattice region of the "0 region" type), the difference extracting section 14 joins the adjacent lattice regions of the "0 region" type together and extracts, as the base point, the center of a contact plane between the joined lattice regions and the specified difference region. Thereafter, the difference extracting section 14 shifts to the processing of step S93 (FIG. 4F) as indicated by the junction H. Note that the processing of step S83 is executed when there is a difference, shown in FIG. 7A, between two three-dimensional models.

On the other hand, if the type specified in the processing of step S77 is the "0 region" ("Yes" route from step S81), the difference extracting section 14 extracts a contact plane between a surface of the specified difference region and a surface of the specified model and stores data of the contact plane in the work memory 12 (step S85). The difference extracting section 14 then shifts to the processing of step S93 (FIG. 4F) as indicated by the junction H. Note that the processing of step S85 is executed when there is a difference, shown in FIG. 10A, between two three-dimensional models.

Figure 4F:
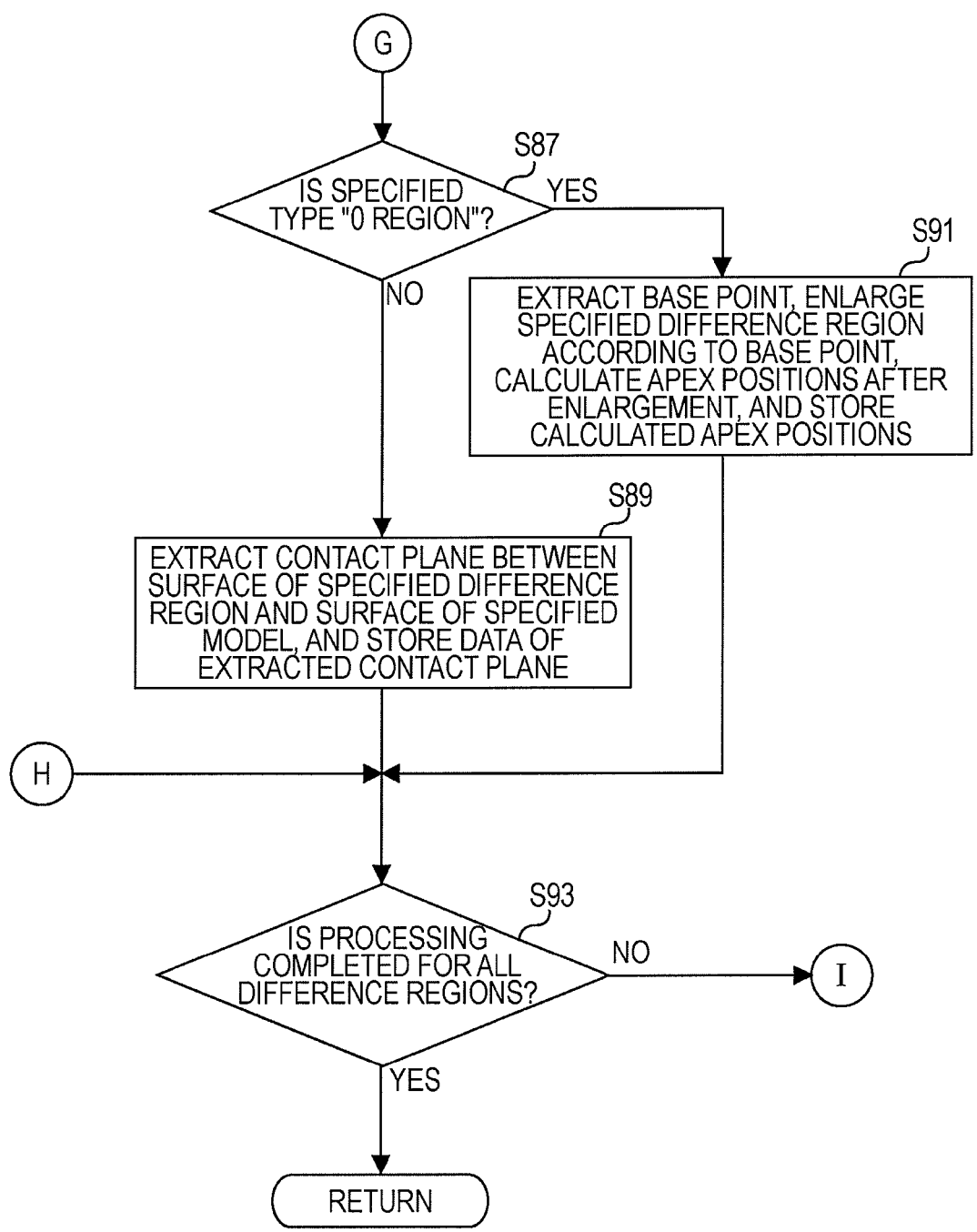
FIG. 4F is a flowchart showing a processing flow (second part) of the different region enlarging process.

After shifting to the flowchart of FIG. 4F as indicated by the junction G, the difference extracting section 14 determines whether the type specified in the processing of step S77 is the "0 region" (step S87). If the type specified in the processing of step S77 is not the "0 region" ("No" route from step S87), the difference extracting section 14 extracts a contact plane between a surface of the specified difference region and a surface of the specified model and stores data of the contact plane in the work memory 12 (step S89). The difference extracting section 14 then shifts to the processing of step S93. Note that the processing of step S89 is executed when there is a difference, shown in FIG. 11A, between two three-dimensional models.

On the other hand, if the type specified in the processing of step S77 is the "0 region" ("Yes" route from step S87), the difference extracting section 14 extracts a base point, enlarges the specified difference region according to the base point, calculates apex positions after the enlargement, and stores the calculated apex positions in the work memory 12 (step S91). More specifically, if the number of lattice regions of the "out-of-model region" type, which has been counted in step S77, is 0 (i.e., if the specified difference region does not contact the lattice region of the "out-of-model" type), the difference extracting section 14 calculates, as the base point, the center of the specified difference region. If the number of lattice regions of the "out-of-model region" type, which has been counted in step S77, is 1 or more (i.e., if the specified difference region contacts the lattice region of the "out-of-model region" type), the difference extracting section 14 joins the adjacent lattice regions of the "out-of-model region" type together and extracts, as the base point, the center of a contact plane between the joined lattice regions and the specified difference region. Thereafter, the difference extracting section 14 shifts to the processing of step S93. Note that the processing of step S91 is executed when there is a difference, shown in FIG. 12A, between two three-dimensional models.

Then, the difference extracting section 14 determines whether the processing has been completed for all of the difference regions (step S93). If the processing is not yet completed for all of the difference regions ("No" route from step S93), the difference extracting section 14 returns to the processing of step S73 (FIG. 4E) as indicated by a junction I. On the other hand, if the processing is completed for all of the difference regions ("Yes" route from step S93), the difference extracting section 14 returns to the main processing flow.

Returning to the flowchart of FIG. 4D, after executing the difference region enlarging process, the difference extracting section 14 refers to the work memory 12 and determines whether the processing has been completed for all of the three-dimensional models other than the reference model (step S61). If the processing is not yet completed for all of the three-dimensional models other than the reference model ("No" route from step S61), the difference extracting section 14 returns to the processing of step S43 (FIG. 4A) as indicated by a junction F. On the other hand, if the processing is completed for all of the three-dimensional models other than the reference model ("Yes" route from step S61), the output section 15 displays a list of the three-dimensional models on, e.g., the display device based on the data stored in the work memory 12 (step S63).

In the case of two three-dimensional models having a difference shown in FIG. 7A between them, for example, those two three-dimensional models are displayed, as shown in FIG. 8B, when the three-dimensional model on the left side is assumed to be the reference model. In the example of FIG.

8B, as described above, the three-dimensional model on the right side is displayed in such a form that the difference between the two three-dimensional models, i.e., the parallelepiped 810, is enlarged. Additionally, the three-dimensional model on the right side can also be displayed by coloring the difference region.

Figure 10A:
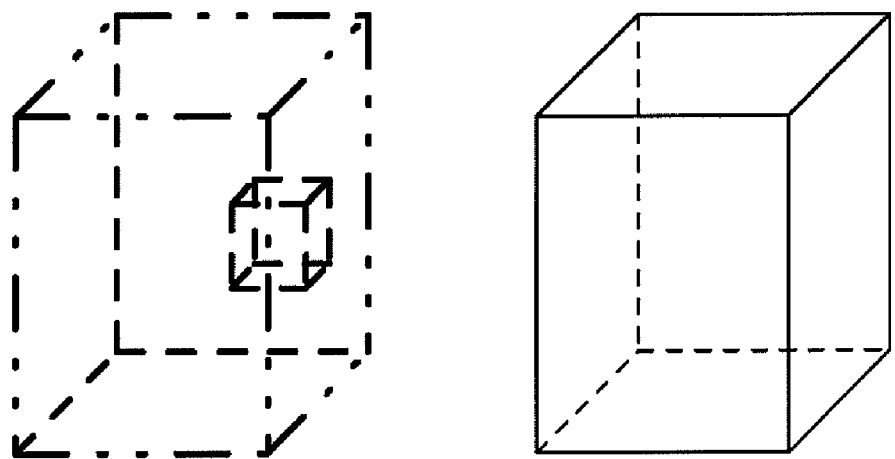
FIGS. 10A and 10B are illustrations for explaining emphatic display in the second embodiment.
Figure 10B:
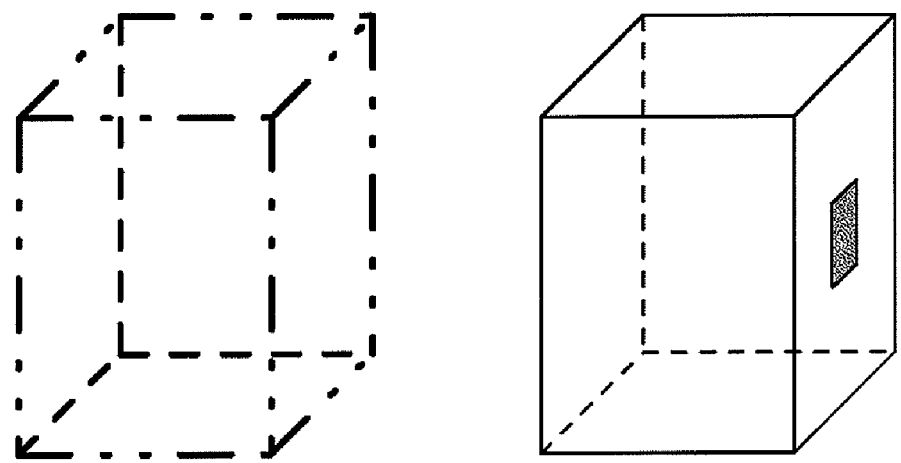

Also, in the case of two three-dimensional models having a difference shown in FIG. 10A between them, those two three-dimensional models are displayed, as shown in FIG. 10B, when the three-dimensional model on the left side is assumed to be the reference model. In FIG. 10B, the position where the difference is present with respect to the reference model is indicated by coloring part of a side surface of the three-dimensional model on the right side.

Figure 11A:
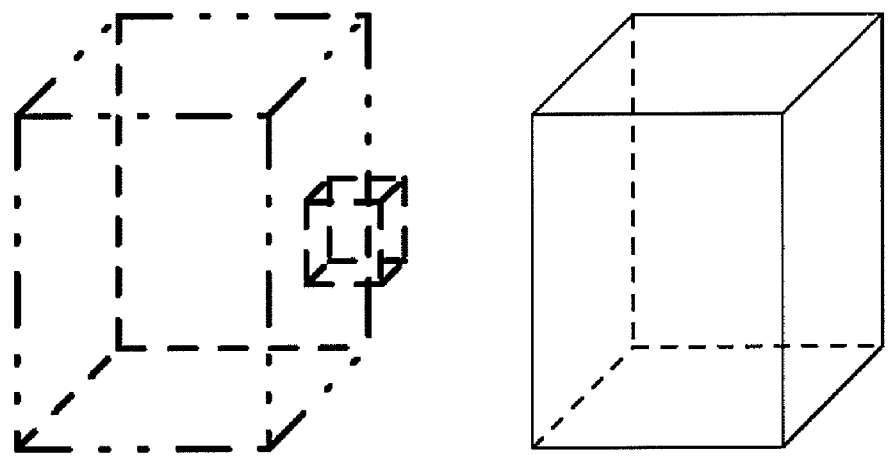
FIGS. 11A and 11B are illustrations for explaining emphatic display in the second embodiment.
Figure 11B:
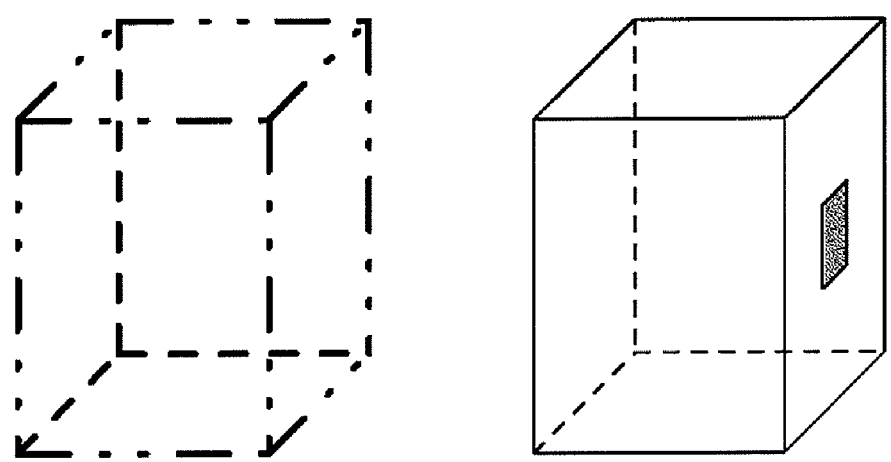

In the case of two three-dimensional models having a difference shown in FIG. 11A between them, those two three-dimensional models are displayed, as shown in FIG. 11B, when the three-dimensional model on the left side is assumed to be the reference model. In FIG. 11B, the position where the difference is present with respect to the reference model is indicated by coloring part of a side surface of the three-dimensional model on the right side.

Figure 12A:
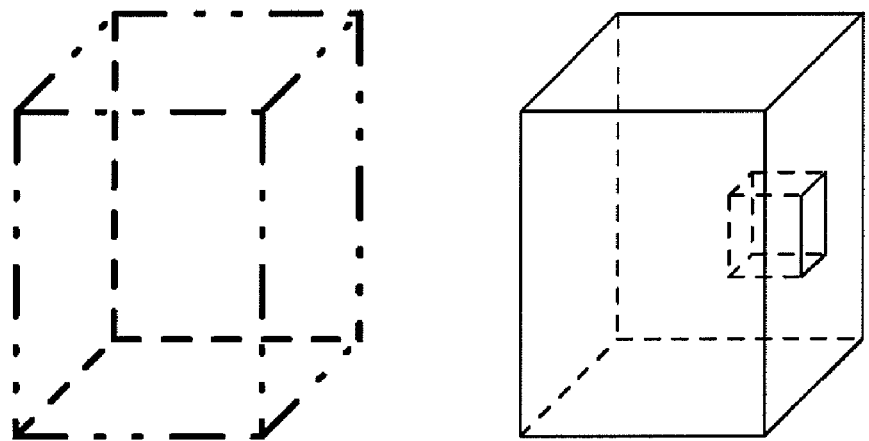
FIGS. 12A and 12B are illustrations for explaining emphatic display in the second embodiment.
Figure 12B:
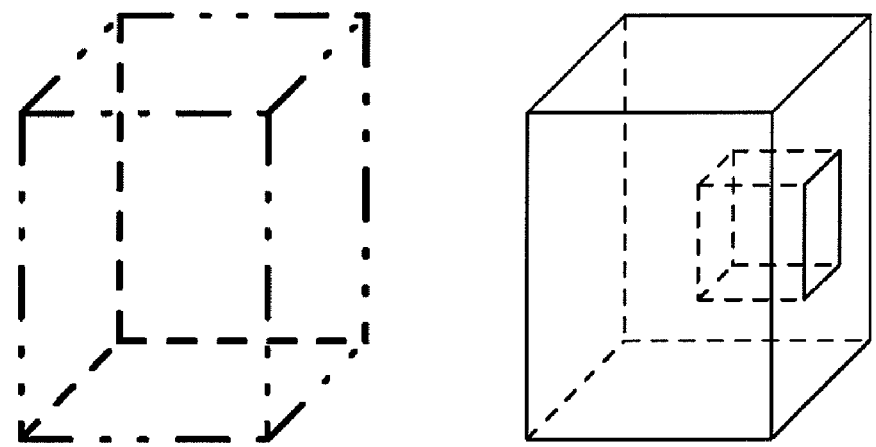

Further, in the case of two three-dimensional models having a difference shown in FIG. 12A between them, those two three-dimensional models are displayed, as shown in FIG. 12B, when the three-dimensional model on the left side is assumed to be the reference model. In FIG. 12B, the three-dimensional model on the right side is displayed in such a form that the difference between the two three-dimensional models, i.e., a recessed region, is enlarged. Additionally, the three-dimensional model on the right side can also be displayed by coloring the difference region.

By executing the above-described process, the difference between the reference model and the three-dimensional model other than the reference model can be displayed in an enlarged and/or colored way. Therefore, the user can easily confirm the difference between the three-dimensional models. Also, the user can easily find the three-dimensional model.

In the second embodiment, when the size of the specified model providing a minimum variance value differs from the original size of the specified model, the specified model is displayed in step S63 in size resulting after the size has been changed in the processing of step S57. However, the specified model may be displayed in the original size according to a scaling factor (enlargement or reduction rate) that determines the size change. For example, when the size of the specified model is enlarged in the processing of step S57, the specified model is reduced and displayed in the original size in its entirety.

Further, while in the second embodiment at least one of the position and the size of the specified model is changed in step S57 to determine the minimum variance value, only one of the position and the size of the reference model may be changed, if desired.

While in the second embodiment the specified difference region is enlarged in steps S83 and S91, steps S83 and S91 may be skipped so as to display the specified difference region just by coloring without enlarging it.

Further, while the specified difference region is not enlarged in the processing of the above-described steps S85 and S89, the contact plane may be extracted after enlarging the specified difference region. In addition to coloring the contact plane, the specified difference region may be displayed by using, e.g., dotted lines.

Several embodiments of the present invention have been described above, but the present invention is not limited to those embodiments. For example, the above-described functional block diagrams do not always correspond to the actual configuration of program modules. Also, in the processing flow, the order of processing steps can be exchanged so long as the processing result is not changed. Further, the processing flow may be executed in parallel.

While the emphatic display is performed by enlargement and coloring in the above-described embodiments, the difference between the three-dimensional models may be displayed in any other suitable manner.

The difference emphasizing apparatus shown in FIG. 2 is constituted by a computer system shown in FIG. 13. The computer system includes a memory 2501 (storage device), a CPU 2503 (processing unit), a hard disk drive (HDD) 2505, a display control unit 2507 connected to a display device 2509, a drive 2513 for a removable disk 2511, an input device 2515, and a communication control unit 2517 for connection to a network, those components being interconnected via a bus 2519. An operating system (OS) and an application program for carrying out the processing required in the above-described embodiments are stored in the HDD 2505 and are read from the HDD 2505 into the memory 2501 when they are executed by the CPU 2503. The CPU 2503 controls the display control unit 2507, the communication control unit 2517, and the drive 2513, as required, to perform necessary operations. Data used during the processing is loaded in the memory 2501 and is stored in the HDD 2505 as the occasion requires. The application program for carrying out the above-described processing in the embodiments of the present invention is stored in the removable disk 2511 which is distributed to the user, and it is installed in the HDD 2505 through the drive 2513. As an alternative, the application program may be installed in the HDD 2505 via the network, e.g., the Internet, and the communication control unit 2517. The computer system realizes the above-described various functions with organic cooperation of hardware, such as the CPU 2503 and the memory 2501, the OS, and the necessary application program.

What is claimed is:

1. A non-transitory computer readable recording medium storing a difference emphasizing program executed by a computer, the program comprising:

a superimposing procedure of aligning a first three-dimensional model and a second three-dimensional model in orientation and position in accordance with a predetermined rule, and storing, in a storage device, data of respective apices of the first three-dimensional model and the second three-dimensional model having been aligned in orientation and position;

a finding procedure of, based on the data stored in the storage device, finding a corresponding point on the first three-dimensional model, which corresponds to the apex of the second three-dimensional model in a direction of a particular axis;

a difference calculating procedure of, when the corresponding point is detected in the finding procedure, calculating a difference between the first three-dimensional model and the second three-dimensional model in the direction of the particular axis based on the corresponding point and the apex of the second three-dimensional model, and storing the calculated difference in the storage device; and an enlarging procedure of enlarging the difference stored in the storage device in the direction of the particular axis, calculating a position of the apex of the second three-dimensional model after the enlargement, and storing the calculated position in the storage device.

2. A non-transitory computer readable recording medium storing a difference emphasizing program executed by a computer, the program comprising:
- a superimposing procedure of aligning a first three-dimensional model and a second three-dimensional model in orientation and position in accordance with a predetermined rule, and storing, in a storage device, data of respective apices of the first three-dimensional model and the second three-dimensional model having been aligned in orientation and position;
- a finding procedure of, based on the data stored in the storage device, finding a first region present only in the first three-dimensional model and a second region present only in the second three-dimensional model, the first region and the second region providing a region which has a minimum variance value, by changing at least one of the orientation, position and size of the first three-dimensional model or the second three-dimensional model within a predetermined range; and
- an emphatically displaying procedure of presenting the first three-dimensional model and the second three-dimensional model to a user in a comparable form, and emphatically displaying at least part of portions, which correspond to the first region and the second region detected in the finding procedure, in the second three-dimensional model having been changed in the finding procedure.

3. The non-transitory computer readable recording medium according to claim 1, further comprising:
- a presenting procedure of, based on the data stored in the storage device, presenting the first three-dimensional model and the second three-dimensional model to a user in a comparable form.

4. The non-transitory computer readable recording medium according to claim 2,
- wherein, in the emphatically displaying procedure, the first region and the second region detected in the finding procedure are enlarged, and the enlarged first region and the enlarged second region are displayed to be located in corresponding portions of the second three-dimensional model having been changed in the finding procedure.

5. The non-transitory computer readable recording medium according to claim 2,
- wherein, in the emphatically displaying procedure, when the first region and the second region detected in the finding procedure are displayed to be located in corresponding portions of the second three-dimensional model having been changed in the finding procedure, a contact surface between a surface of the first region or the second region and a surface of the second three-dimensional model is extracted and the contact surface is emphatically displayed in the second three-dimensional model.

6. The non-transitory computer readable recording medium according to claim 2,
- wherein, in the emphatically displaying procedure, a size of the first three-dimensional model or the second three-dimensional model after the change is reduced or enlarged to the size of the first three-dimensional model or the second three-dimensional model before the change in accordance with a reduction rate or an enlargement rate which has been set in changing the size in the finding procedure.

7. The non-transitory computer readable recording medium according to claim 2,
- wherein, in the finding procedure, each of the first three-dimensional model and the second three-dimensional model is divided into lattice regions, and the first region and the second region are extracted based on the divided lattice regions.

8. The non-transitory computer readable recording medium according to claim 1,
- wherein, in the superimposing procedure, the first three-dimensional model and the second three-dimensional model are aligned in orientation by specifying respective directions of an X-axis, a Y-axis and a Z-axis based on the respective apices of the first three-dimensional model and the second three-dimensional model,
- and the first three-dimensional model and the second three-dimensional model are aligned in position based on respective solids circumscribing the first three-dimensional model and the second three-dimensional model.

9. The non-transitory computer readable recording medium according to claim 2,
- wherein, in the superimposing procedure, the first three-dimensional model and the second three-dimensional model are aligned in orientation by specifying respective directions of an X-axis, a Y-axis and a Z-axis based on the respective apices of the first three-dimensional model and the second three-dimensional model,
- and the first three-dimensional model and the second three-dimensional model are aligned in position based on respective solids circumscribing the first three-dimensional model and the second three-dimensional model.

10. A difference emphasizing method comprising:
- a superimposing procedure of aligning a first three-dimensional model and a second three-dimensional model in orientation and position in accordance with a predetermined rule, and storing, in a storage device, data of respective apices of the first three-dimensional model and the second three-dimensional model having been aligned in orientation and position;
- a finding procedure of, based on the data stored in the storage device, finding a corresponding point on the first three-dimensional model, which corresponds to the apex of the second three-dimensional model in a direction of a particular axis;
- a difference calculating procedure of, when the corresponding point is detected in the finding procedure, calculating a difference between the first three-dimensional model and the second three-dimensional model in the direction of the particular axis based on the corresponding point and the apex of the second three-dimensional model, and storing the calculated difference in the storage device; and
- an enlarging procedure of enlarging the difference stored in the storage device in the direction of the particular axis, calculating a position of the apex of the second three-dimensional model after the enlargement, and storing the calculated position in the storage device.

11. A difference emphasizing method comprising:
- a superimposing procedure of aligning a first three-dimensional model and a second three-dimensional model in orientation and position in accordance with a predetermined rule, and storing, in a storage device, data of respective apices of the first three-dimensional model and the second three-dimensional model having been aligned in orientation and position;
- a finding procedure of, based on the data stored in the storage device, finding a first region present only in the first three-dimensional model and a second region present only in the second three-dimensional model, the first region and the second region providing a region which has a minimum variance value, by changing at least one of the orientation, position and size of the first three-dimensional model or the second three-dimensional model within a predetermined range; and an emphatically displaying procedure of presenting the first three-dimensional model and the second three-dimensional model to a user in a comparable form, and emphatically displaying at least part of portions, which correspond to the first region and the second region detected in the finding procedure, in the changed second three-dimensional model.

12. A difference emphasizing apparatus comprising:

a superimposing unit for aligning a first three-dimensional model and a second three-dimensional model in orientation and position in accordance with a predetermined rule, and storing, in a storage device, data of respective apices of the first three-dimensional model and the second three-dimensional model having been aligned in orientation and position;

a finding unit for, based on the data stored in the storage device, finding a corresponding point on the first three-dimensional model, which corresponds to the apex of the second three-dimensional model in a direction of a particular axis;

a difference calculating unit for, when the corresponding point is detected by the finding unit, calculating a difference between the first three-dimensional model and the second three-dimensional model in the direction of the particular axis based on the corresponding point and the apex of the second three-dimensional model, and storing the calculated difference in the storage device; and an enlarging unit for enlarging the difference stored in the storage device in the direction of the particular axis, calculating a position of the apex of the second three-dimensional model after the enlargement, and storing the calculated position in the storage device.

13. A difference emphasizing apparatus comprising:

a superimposing unit for aligning a first three-dimensional model and a second three-dimensional model in orientation and position in accordance with a predetermined rule, and storing, in a storage device, data of respective apices of the first three-dimensional model and the second three-dimensional model having been aligned in orientation and position;

a finding unit for, based on the data stored in the storage device, finding a first region present only in the first three-dimensional model and a second region present only in the second three-dimensional model, the first region and the second region providing a region which has a minimum variance value, by changing at least one of the orientation, position and size of the first three-dimensional model or the second three-dimensional model within a predetermined range; and an emphatically displaying unit for presenting the first three-dimensional model and the second three-dimensional model to a user in a comparable form, and emphatically displaying at least part of portions, which correspond to the first region and the second region detected by the finding unit, in the second three-dimensional model having been changed by the finding unit.

* * * * *